3,285,828
PROCESS FOR PRODUCTION OF CITRIC ACID BY FERMENTATION

William Gold, Spring Valley, N.Y., and Robert J. Kieber, Rumson, N.J., assignors to Stepan Fermentation Chemicals, Inc., Keyport, N.J., a corporation of Delaware
No Drawing. Filed Dec. 16, 1964, Ser. No. 418,887
31 Claims. (Cl. 195—36)

This application is a continuation in part of application Serial No. 12,925, filed March 7, 1960, now abandoned, and of copending application Serial No. 328,501, filed December 6, 1963, now abandoned.

According to the invention preparatory to the fermentation, there is added to a fermentation medium containing a suitable fermentable carbon source in a cool, sterile condition, a sterile ferocyanide or ferricyanide salt, and a citric acid producing and accumulating organism for production of citric acid from the carbon source, and the resulting cool medium containing the salt and organism is provided at a pH of about 6–9. The fermentation is then carried out by maintaining the medium for a time and at conditions suitable for the production of citric acid. During the fermentation, the pH can be permitted to decrease in dependence on citric acid production.

The fermentation can be carried out in a deep tank, and a principal advantage of the method is that it facilitates production of citric acid by the deep tank or submerged culture procedure.

Another principal advantage of the method of the invention is that it is suited to produce citric acid from readily available carbon sources in the unrefined condition. Preferably the carbon source is an impure sugar cane material, such as cane blackstrap molasses or cane high test molasses. Other impure sources can be used. The fermentable carbon source need not, however, be an impure material, and it can be any carbon source known in the art as a suitable substrate for production of citric acid. Beet molasses and starch hydrolysates are suitable.

The citric acid producing and accumulating organism can be any of the known organisms for this purpose. Thus, it can be of the groups, Aspergillus, Citromyces, Penicillium and Monilia. Black Aspergilli, particularly *Aspergillus niger*, are well suited. Suitable species are *Aspergillus japonicus, Aspergillus clavatus, Paecylomyces divaricatum, Mucor piriformis, Penicillium luteum*, and *Penicillium citrinum*. The organism, upon introduction into the fermentation medium is preferably in the form of spores since the greatest benefits from the method of the invention are realized when the organism is in this form. The organism can, however, be in other forms. Thus, it can be in the form of mycelium pre-germinated spores, or comminuted mat.

Usually, there will be an optimum amount of inoculum, especially where the fermentation is carried out in a deep tank, as when the amount of inoculum is excessive, aeration is interferred with to the extent that yield is reduced. This is commonly the case where a germinated inoculum is employed, and in each case, advantageously, the inoculum is used in an amount predetermined to provide relatively high yields. The optimum amount can be determined by experiment.

The iron cyanide salt can, in general, be any salt soluble in the fermentation medium, e.g. water-soluble iron cyanide salts, preferably inorganic salts such as sodium or potassium salts.

The pH of the medium can be adjusted by addition to the medium of an aqueous solution of a pH adjusting agent. In the case of impure cane derived sources the natural pH of aqueous solutions thereof will usually be on the acid side and below about 5.5. Thus, in the case of cane blackstrap molasses, the natural pH of the aqueous solutions is commonly about 4.8–5.2. For adjusting the pH of such solutions, calcium hydroxide, calcium oxide, sodium hydroxide, and the like can be used to raise the pH into the range of about 6–9, which is the pH condition of the invention for the medium.

A preferred pH range for the medium is about 6.5–9 and commonly the preferred pH range is about 7–8 and, for cane blackstrap molasses, the ranges of about 6.5–9, preferably about 7–8, have particular application. Commonly for cane blackstrap molasses the optimum value is about 8. The optimum value is related to the degree of impurity. In general, the more impure the medium the higher the optimum pH value.

The pH can be, and preferably is allowed to decrease in dependence upon citric acid production. Thus, the pH need not be adjusted during the fermentation by addition of acid or base. Fried, U.S. Patent 2,910,409, issued October 27, 1959, describes a procedure wherein the pH is adjusted during the fermentation by addition of acid.

In Fried, acid is added during the fermentation to control growth of the mold, and in particular to substantially arrest growth of the organism at the pellet stage providing high yield of citric acid. In the method of the invention, the fermentation is carried out without acid addition to control growth of the mold as is done in Fried.

The procedure for the fermentation involves forming an aqueous fermentation medium by dissolving the carbon source in water to provide a solution wherein the concentration of the carbon source is limited so that the fermentation rate is not inordinately low. Where the carbon source is cane blackstrap molasses, the amount of molasses in the aqueous solution can be about 20–40% w./v. molasses depending on the particular molasses employed. This corresponds to a total sugar (as sucrose) content of about 10–26% w./v. Amounts of carbon source can be outside the mentioned range and can be either more or less, but in general this will result in reduced efficiency for the process. Commonly, addition of nutrients other than the carbon source is not required. Where, however, the carbohydrate source is deficient in respect to nutrient materials, the addition, e.g. of nitrogenous material or mineral material such as phosphorous compounds, are desirable.

The fermentation medium is then sterilized with heat. The sterilization is carried out in the usual manner, i.e. by heating the medium at a temperature of usually at least about 100° C. to destroy organisms present therein which would interfere with the fermentation.

The hot sterile medium is then cooled from sterilization temperature and the iron cyanide salt, in sterile and preferably cooled condition, and the organisms for the fermentation, and the pH adjusting reagent are then added to the medium. The fermentation can then be carried out by maintaining the medium at fermentation conditions for a suitable time.

It is important to realization of the improvement of the invention that the sterile fermentation medium be cooled before the iron cyanide salt is added thereto. The temperature to which it is cooled can be in the range of about ambient temperature to about 75° C., and preferably about ambient temperature to about 50° C., for example 40° C., and optimally about ambient temperature to about 30° C. While the temperature, at which the iron cyanide salt is added can be in excess of 50° C., this is undesirable, since the procedure of the invention is then of substantially less effectiveness. The medium can be cooled to below 30° C. before addition of the salt but this would not provide any advantage and would usually be inconvenient since the usual temperature for the fermentation is about 30° C.

The iron cyanide salt added to the fermentation medium can be in the form of a sterile, aqueous solution thereof.

This can be provided by dissolving the iron cyanide salt, commercial grade, in water and then sterilizing with heat. When sterilized in this manner, the salt solution is preferably concentrated, e.g. a 10% w./v. solution of the salt. The amount of the salt added to the fermentation medium can be about 0.05–0.4% by weight per 20% w./v. of molasses present in the fermentation medium. Amounts, either more or less, outside this range can be used, but the mentioned range is preferred. In general, within the preferred range there will be an optimum amount of the salt. The optimal amount will usually depend on the particular carbon source used, for example the particular cane blackstrap molasses, and it can be determined by testing to provide the best time-yield relationship. The variation in yield, even over a narrow range such as 0.05–0.4% by weight of the salt, is commonly as much as 75% of the optimum yield. The amount of the salt solution added to the fermentation medium will in general be small in comparison to the fermentation medium, e.g. 1%, and the salt solution added will not substantially alter the molasses concentration in the medium. Advantageously, the salt solution is cooled before addition to the medium. The temperatures mentioned herein as suitable, preferable, etc. for the medium apply similarly to the salt solution.

With respect to the pH adjustment, it is important in order to realize the full benefits of the invention that the pH of the medium at the beginning of the fermentation be in the range of about 6–9, preferably about 7–8 and optimally about 8. Preferably, the adjustment in pH is made after sterilization and when the medium is in the cooled condition. Thus, in the case of impure cane derived carbon sources, such as for example, cane blackstrap molasses, reducing sugars are degraded if the sterilization is carried out at an elevated pH. The degradation can be avoided by sterilizing before adjusting the pH.

When the pH is adjusted after sterilization, it should be done aseptically as is the addition of iron cyanide salt. The suitable and preferred temperatures for adjustment of pH are in general the same as those for the addition of the iron cyanide salt.

A distinctive feature of the procedure of the invention is the provision of the medium containing the iron cyanide salt in sterile condition without sterilizing the medium with heat when the salt is present therein. Further, as described above, sterilizing with heat when the medium is at the initial pH for the fermentation should be avoided. Normally, these requirements will necessitate the procedure described above of separately sterilizing the medium containing the carbon source, without the iron cyanide salt, and at the natural pH, and thereafter adding to the cooled medium the iron cyanide salt and adjusting the pH of the cooled medium. If, however, a means of sterilizing other than by application of heat is resorted to, it will be apparent that the improvement of the invention can be realized by providing a cool fermentation medium containing the carbon source, including in the cool medium the iron cyanide salt, and providing the medium containing the salt in sterile condition while in said cooled condition, and further providing the cool sterile fermentation medium at the desired initial pH for the fermentation.

The fermentation, by the submerged culture procedure can be carried out in a manner known in the art. Thus, the fermentation can be carried out in a deep tank wherein the medium is agitated and aerated with air or other oxygen containing gas. The temperature for the fermentation can be in the range of about 25–35° C., preferably 29–32° C., and optimally 31° C. Atmospheric, or if desired, slightly elevated pressure in order to preclude harmful leakage, can be employed. The fermentation period can be two days or longer.

Alternatively, the fermentation can be carried out by the shallow pan procedure.

The use of a ferricyanide or ferrocyanide salt and of a pH according to the invention provides improvement in respect to yield of the citric acid.

The invention is further described in the following examples:

*Example 1*

A fermentation medium is prepared in a 6" x 18" Pyrex jar provided with a stirrer and sparger for aeration. A 4 liter aqueous solution of cane blackstrap molasses containing 20% w./v. molasses which provides a total sugar content for the solution of about 12% w./v., is introduced into the jar. This mash is sterilized, cooled to about 30° C. and there is added thereto 8 grams of potassium ferricyanide contained in a cool, sterilized 10% aqueous solution thereof, and the solution is then adjusted from a natural pH for the solution of 5 to pH 6.1 with calcium hydroxide.

For inoculation of the fermentation medium, 20 ml. of an aqueous suspension of germinated spores of an Aspergillus sp. is added aseptically to the fermentation medium. The inoculum-containing medium is agitated and aerated at 31° C. for six days. Sterile antifoam, as required, is added by pipette.

For fermentation as described, samples of the medium were taken periodically and titrated to determine citric acid content. The results are set forth in Table I.

TABLE I

| Fermentation period, days: | Percent acid as citric in medium |
|---|---|
| 2 | 2.44 |
| 3 | 3.1 |
| 6 | 5.9 |

*Example 2*

A fermentation medium is prepared by charging a 2,000 gallon capacity deep tank fermentor with 1,700 gallons of water diluted cane blackstrap molasses. The diluted molasses is 25% w./v. 79 Brix molasses and has a sugar (as sucrose) content of 13.1% w./v. The diluted molasses is sterilized at 100° C. for 15 minutes, and then cooled to 30° C. An aqueous solution of 24 pounds of sodium ferrocyanide and 32 pounds of calcium hydroxide in 20 gallons of water is sterilized by heating to 100° C., cooled to about room temperature, and then added to the sterilized and cooled contents of the fermentor. Following this addition, the pH of the medium is 7.8.

For inoculation of the fermentation medium, a 500 ml. aqueous suspension of spores of an Aspergillus sp. is introduced into the tank and the fermentation is carried out at 31° C. and with agitation and aeration. Antifoam is added as required to limit foaming. The time for the fermentation is 6 days.

For a fermentation as described, the yield by titration for acid and chemical analysis was 8.7% w./v. citric acid.

*Example 3*

In this example, two groups of runs are carried out. In each group potassium ferrocyanide is used and the groups differ in that in one group the fermentation is at the natural pH of about 5 whereas in the other group, the pH is adjusted to 8 before the fermentation is begun. The individual runs of each group differ in that the amount of inoculum used is not the same.

Fermentation media are prepared by providing in each of 6, 1" x 6" test tubes 10 ml. of 20% w./v. cane blackstrap molasses. The media are sterilized by heating and cooled to room temperature. Thereafter there is added to each of the test tubes 20 mg. of potassium ferrocyanide contained in 10% aqueous solution which has been sterilized by steaming for 10 minutes and then cooled to room temperature before the addition. In the case of the runs made at pH 8, following sterilization and cooling to room temperature, and just before addition of the ferrocyanide salt, there is added to each test tube 0.1 ml. of 4 N sodium hydroxide which is in sterilized condition.

For inoculation of the fermentation media, an aqueous suspension of germinated spores of an Aspergillus sp. is added to each test tube. The amounts of inoculum added to the various test tubes are as indicated in Table II. The fermentations are then carried out by maintaining the media at 31° C. for 7 days while shaking at 270 r.p.m. Results for the fermentations are set forth in the table.

TABLE II

| Ml. of inoculum | Percent Acid as Citric | |
|---|---|---|
| | Group I (pH 5) | Group II (pH 8) |
| 0.1 | 4 | 6 |
| 0.5 | 5 | 5 |
| 1.0 | 3 | 3 |

The explanation for the relatively low yields at the high pH and large inoculum, is that the culture growth in the medium is so extensive that the culture interferes with aeration. The good yields at natural pH are due to the large amount of inoculum used and to the inoculum being in pre-germinated condition. The example demonstrates that at the high pH, a small inoculum grows well and produces good yields.

*Example 4*

In this example, a series of fermentations are carried out in the manner of Example 3 except that potassium ferricyanide is used instead of potassium ferrocyanide.

The results for the fermentation are set forth in the following table:

TABLE III

| Ml. of inoculum | Percent Acid as Citric | |
|---|---|---|
| | Group I (pH 5) | Group II (pH 8) |
| 0.1 | 4.0 | 5.5 |
| 0.5 | 4.5 | 5.0 |
| 1.0 | 5.5 | 3.0 |

The explanation for the relatively low yields at the high pH and large inoculum, is that the culture growth in the medium is so extensive that the culture interferes with seration. The good yields at natural pH are due to the large amount of inoculum used and to the inoculum being in pre-germinated condition. The example demonstrates that at the high pH, a small inoculum grows well and produces good yields.

*Example 5*

In this example, 3 runs were carried out which differed from each other in the initial pH for the fermentation.

Fermentation media were prepared as in Example 3 except for the extent of pH adjustment which was as is indicated in the following table, and except that 10 mg. of potassium ferricyanide per test tube is used in place of the 20 mg. of potassium ferrocyanide used in Example 3.

For inoculation of the fermentation media, an aqueous suspension of spores of an Aspergillus sp. in the amount of 0.1 ml. was added to each fermentation medium, and the fermentations were then carried out in the manner described in Example 3.

Results for the fermentations are set forth in the following table. Duplicate runs were made.

TABLE IV

| pH of medium | Percent Acid as Citric | |
|---|---|---|
| | (a)[1] | (b)[1] |
| 5 | 3.4 | 3.2 |
| 7 | 7.3 | 8.2 |
| 8 | 7.8 | 8.3 |

[1] Duplicate runs were carried out.

*Example 6*

In this example, two groups of fermentations were carried out. The two groups differ in respect to the organism used, and the individual runs of each group differ in respect to the amount of inoculum used.

Fermentation media were prepared by providing in 1" x 6" test tubes 10 ml. of 20% w./v. cane blackstrap molasses. The media were sterilized by heating and cooled to room temperature. Thereafter there was added to each test tube 0.1 ml. of a 23% aqueous solution of sodium ferrocyanide, which solution had been sterilized and then cooled to room temperature before the addition; and 0.1 ml. of 5 N NaOH, which was also sterilized and cooled before the addition. The pH of the solution was then 8.

For inoculation of the fermentation media, there is added to each tube of Group I 0.1 ml. of an aqueous suspension of spores of the *Aspergillus niger* ATCC #10577. The relative dilution of the spores is indicated in the table. Similarly, there is added to each tube of Group II 0.1 ml. of an aqueous suspension of the *Aspergillus niger* ATCC #11414 and the relative dilution of the spores is indicated in the table. The fermentations were then carried out by maintaining the media at 31° C. for 7 days while shaking at 270 r.p.m. Duplicate runs were made.

TABLE V

| Relative Dilution of Spores | Percent Acid as Citric | | | |
|---|---|---|---|---|
| | ATCC #10577 | | ATCC #11414 | |
| | (a)[1] | (b)[1] | (a)[1] | (b)[1] |
| 1 | 3.5 | 3.9 | 2.6 | 2.2 |
| 0.1 | 3.6 | 3.7 | 3.3 | 3.6 |
| 0.01 | 4.4 | 4.6 | 6.2 | 6.5 |

[1] Duplicate runs were carried out.
The notation "ATCC" means American Type Culture Collection.

The citric acid production reported in the specification as "percent acid as citric" is percent w./v. of acid in the fermented medium calculated as anhydrous citric acid. The acidity of the fermented medium was determined by titration. Of the total acid present 95% or more is citric.

The teaching of Martin in U.S. Patent 2,739,923, issued March 27, 1956, is acknowledged. Martin teaches inclusion of a ferrocyanide salt in a fermentation medium and thereafter sterilizing the medium, a procedure which, according to the present invention should be avoided.

What is claimed is:

1. The method of producing citric acid by fermentation of a fermentable carbon source, which comprises adding to a cool, sterile fermentation medium including the fermentable carbon source, sterile salt selected from the group consisting of ferrocyanide and ferricyanide salts, and a citric acid producing and accumulating organism for the production of citric acid from the carbon source, to provide a cool fermentation medium containing said salt and said organism, providing the cool fermentation medium containing said organism at a pH of about 6.5–9 and maintaining it for a time and at conditions for production of citric acid by fermentation of the carbon source.

2. The method of claim 1, wherein the fermentable carbon source is an impure cane derived material.

3. The method of claim 1, wherein the citric acid producing and accumulating organism is in the form of spores.

4. The method of claim 1, wherein the cool fermentation medium containing said organism is provided at a pH of about 7–8.

5. The method of claim 1, wherein the amount of citric acid producing and accumulating organism is a predetermined amount effective to provide relatively high yield of citric acid.

6. The method of claim 5, wherein the citric acid producing and accumulating organism is pre-germinated.

7. The method of producing citric acid by fermentation of an impure cane derived fermentable carbon source, which comprises forming a fermentation medium by diluting with water the fermentable carbon source to provide an aqueous solution of the carbon source of pH less than about 5.5, providing the fermentation medium in cool and sterile condition, adding to the cool sterile fermentation medium sterile salt selected from the group consisting of ferrocyanide and ferricyanide salts, adjusting the pH of the cool and sterile fermentation medium to about 6.5–9, including in the sterile fermentation medium a citric acid producing and accumulating organism, and maintaining the fermentation medium containing said salt and said organism for a time and at conditions for production of citric acid by fermentation of the carbon source.

8. The method of claim 7, wherein the impure cane derived fermentable carbon source is cane blackstrap molasses.

9. The method of claim 7, wherein the citric acid producing and accumulating organism is in the form of spores.

10. The method of producing citric acid by fermentation of cane blackstrap molasses, which comprises forming a fermentation medium by diluting with water the molasses to about 20–40% w./v. molasses and provide an aqueous solution of the molasses of pH less than about 5.5, sterilizing the solution by heating and thereafter cooling the solution, adding to the cooled solution about 0.05–0.4% by weight per 20% w./v. molasses in the cooled solution of a sterile water soluble salt selected from the group consisting of ferrocyanide and ferricyanide water soluble salts, adjusting the pH of the cool and sterile fermentation medium to about 6.5–9, including in the sterile fermentation medium a citric acid producing and accumulating organism, and maintaining the fermentation medium containing said salt and said organism for a time and at conditions for production of citric acid by fermentation of the carbon source.

11. The method of claim 10, wherein the fermentation is submerged fermentation and the fermentation conditions include aeration and agitation of the fermentation medium.

12. The method of claim 10, wherein the citric acid producing and accumulating organism is in the form of spores.

13. The method of producing citric acid by fermentation of a fermentable carbon source, which comprises providing a cool fermentation medium including the fermentable carbon source, including in said cool medium a salt selected from the group consisting of ferrocyanide and ferricyanide salts, providing the medium containing said salt in sterile condition while in said cooled condition, including in the medium a citric acid producing and accumulating organism for production of citric acid from the carbon source, providing the cool, sterile fermentation medium containing said organism at a pH of about 6.5–9 and maintaining the medium for a time and at conditions for production of citric acid by fermentation of the carbon source.

14. The method of claim 13, wherein the fermentable carbon source is an impure cane derived material.

15. The method of claim 13, wherein the citric acid producing and accumulating organism is in the form of spores.

16. The method of claim 13, wherein the amount of salt included in the fermentation medium is a predetermined amount providing a suitable time-yield relationship for citric acid production and determined by testing of the fermentable carbon source for the effect of the amount of salt on the time-yield relationship.

17. The method of producing citric acid by fermentation of an impure cane derived fermentable carbon source, which comprises providing a cool fermentation medium comprising an aqueous solution at a pH of less than about 5.5 of the fermentable carbon source, including in said cool medium a salt selected from the group consisting of ferrocyanide and ferricyanide salt, providing the medium containing said salt in sterile condition while in said cooled condition, including in the medium spores of a citric acid producing and accumulating organism for production of citric acid from the carbon source, providing the cool, sterile fermentation medium containing said organism at a pH of about 7–8, and maintaining it for a time and at conditions for production of citric acid by fermentation of the carbon source.

18. The method of claim 17, wherein the impure cane derived fermentable carbon source is cane blackstrap molasses.

19. The method of claim 17, wherein the citric acid producing and accumulating organism is in the form of spores.

20. The method of claim 1, wherein the fermentable carbon source is an impure cane derived material and the cool fermentation medium containing said organism is provided at a pH of about 7–8.

21. The method of claim 20, wherein the citric acid producing and accumulating organism is in the form of spores.

22. The method of claim 4, wherein the citric acid producing and accumulating organism is in the form of spores.

23. The method of claim 2, wherein the impure cane derived material is cane blackstrap molasses.

24. The method of claim 23, wherein the medium is provided at a pH of about 7–8.

25. The method of claim 4, wherein the fermentable carbon source is an impure cane derived material.

26. The method according to claim 1, wherein the fermentable carbon source is cane blackstrap molasses.

27. The method of producing citric acid by fermentation of cane blackstrap molasses, which comprises adding to a cool, sterile fermentation medium including the molasses, sterile salt selected from the group consisting of ferrocyanide and ferricyanide salts, and a citric acid producing and accumulating organism for the production of citric acid from the carbon source, to provide a cool fermentation medium containing said salt and said organism, providing the cool fermentation medium containing said organism at a pH of about 6–9 and maintaining it for a time and at conditions for production of citric acid by fermentation of the carbon source.

28. The method of claim 1, the pH of the medium decreasing during the fermentation and all of the decrease in pH being in consequence of fermentation.

29. The method of claim 7, wherein the cool fermentation medium containing said organism is provided at a pH of about 7–8.

30. The method of claim 10, wherein the cool fermentation medium containing said organism is provided at a pH of about 7–8.

31. The method of claim 13, wherein the cool fermentation medium containing said organism is provided at a pH of about 7–8.

References Cited by the Examiner

UNITED STATES PATENTS

| | | | |
|---|---|---|---|
| 2,739,923 | 3/1956 | Martin | 195—36 |
| 2,910,409 | 10/1959 | Fried | 195—36 |

A. LOUIS MONACELL, *Primary Examiner.*

L. M. SHAPIRO, *Assistant Examiner.*